United States Patent [19]

Fickel

[11] 4,019,964
[45] Apr. 26, 1977

[54] METHOD FOR CONTROLLING THE REBOILER SECTION OF A DUAL REBOILER DISTILLATION COLUMN

[75] Inventor: R. Gene Fickel, Roselle, Ill.

[73] Assignee: Universal Oil Products Company, Des Plaines, Ill.

[22] Filed: June 16, 1975

[21] Appl. No.: 587,469

Related U.S. Application Data

[63] Continuation-in-part of Ser. No. 459,992, April 11, 1974, abandoned.

[52] U.S. Cl. .............................. 203/1; 203/DIG. 18; 203/DIG. 9; 202/155; 202/160; 202/206
[51] Int. Cl.[2] .......................................... B01D 3/42
[58] Field of Search ................................ 203/1–3, 203/DIG. 18, DIG. 9; 202/155, 158, 160, 206; 196/132; 208/DIG. 1

[56] References Cited

UNITED STATES PATENTS

| | | | |
|---|---|---|---|
| 2,974,182 | 3/1961 | Van Pool | 260/683.42 |
| 3,225,550 | 12/1965 | Kelley et al. | 203/1 |
| 3,309,288 | 3/1967 | Bulterbaugh | 203/1 |
| 3,324,010 | 6/1967 | Bauer | 203/1 |
| 3,340,158 | 9/1967 | Bates | 202/160 |
| 3,411,308 | 11/1968 | Bellinger | 203/1 |
| 3,803,002 | 4/1974 | Skrata et al. | 202/155 |
| 3,826,719 | 7/1974 | Boyd et al. | 202/206 |

*Primary Examiner*—Wilbur L. Bascomb, Jr.
*Attorney, Agent, or Firm*—James R. Hoatson, Jr.; Robert W. Erickson; William H. Page, II

[57] ABSTRACT

A control method and system for regulating the heat input to the reboiler section of a distillation column having attendant thereto a first external heat-recovery reboiler. Flow-measuring means, disposed within a substantially liquid-free environment, produces a signal which is representative of the quantity of vapor flowing from the reboiler section upwardly into the fractionation section of the column. This signal is transmitted to heat-varying means whereby the heat input to a second external reboiler heater is regulated in response to the quantity of vapor flow.

3 Claims, 1 Drawing Figure

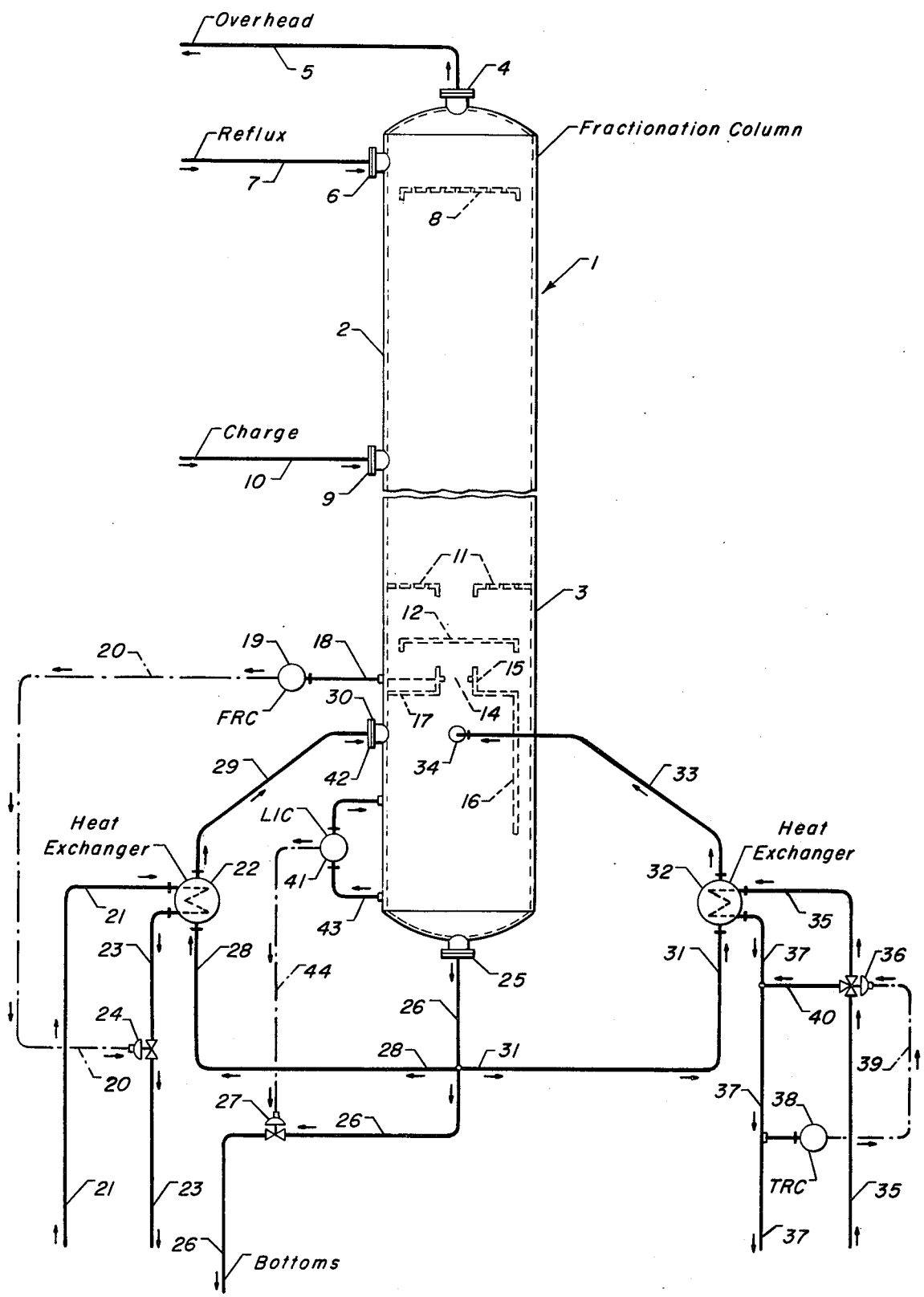

METHOD FOR CONTROLLING THE REBOILER SECTION OF A DUAL REBOILER DISTILLATION COLUMN

RELATED APPLICATION

The present application is a continuation-in-part of my copending application, Ser. No. 459,992, filed Apr. 11, 1974, and now abandoned, all the teachings of which copending application are incorporated herein by specific reference thereto.

APPLICABILITY OF INVENTION

The control system, encompassed by the present inventive concept, is intended for integration into a fractionation, or distillation facility in which external reboiling of a portion or the liquid bottoms material is utilized to supply the heat input necessary to effect the desired separation of feed stock components. Processes, in both the petroleum and petrochemical industries, utilizing some form of fractionation, or distillation facility, are of a wide variety. In some situations, process design considerations dictate the incorporation of an external heat-recovery reboiler into the distillation facility. Heat is supplied to the reboiler section of the distillation column by a circulating external process stream through the heat-recovery reboiler, whereby a portion of the liquid bottoms material is vaporized and returned, in mixed-phase, to the column. The temperature of the circulating process stream, returned to other parts of the overall process, is generally fixed within relatively narrow limits. As a result of variations in the flow rate, or supply temperature, of the circulating process stream, the quantity of heat supplied to the heat-recovery reboiler necessarily fluctuates. Additionally, experience indicates that the quantity of heat so supplied is not sufficient for the total required distillation column duty. This heat efficiency necessitates a second "column control" external reboiler heater to supply the additional heat input to the reboiler section of the distillation column.

Both the heat-recovery boiler heater, and the column control reboiler heater (which may be either direct-fired, or of the more common heat-exchange type), produce a heated, mixed-phase bottoms material which is re-introduced into the column via the reboiler section. Vapors pass upwardly into the fractionation section while the liquid portion is generally withdrawn from the distillation facility in response to a liquid-level control device. The quantity of vapors actually passing upwardly from the reboiler section has a direct, pronounced effect upon the ultimately achieved separation. Also, while many factors contribute to the thermal balance, or stability of the fractionation function, perhaps the most significant is the effect produced by the heat input via the reboiling operation. My invention affords a method of controlling such heat input which results in greater stability with respect to both thermal balance and separation efficiency.

For the purpose of providing a clear understanding of the present control system, the definition of several terms, as employed herein and in the appended claims, is believed to be warranted. The use of the term "distillation column" is intended to include "fractionation column", "re-run column", "finishing column", "splitter column", "extractive distillation column", etc. Similarly, the "reboiler section" alludes to that portion of the fractionation column below the lowermost tray, or desk; the "fractionation section" connotes that portion of the column above the reboiler section, and is inclusive of the stripping zone (below the feed tray) and the rectification zone (above the feed tray). In short, the present control system enjoys advantageous utility in facilities where separation of a feed stream is effected by way of boiling point differential.

Distillation facilities generally fall into one of two categories; the first being characterized by a reboiler liquid bottoms material having a comparatively wide boiling range. The second category is characterized by a liquid bottoms material which is either a substantially pure compound, or a component mixture having a relatively narrow boiling range, say 10° F. or less. Exemplary of processes having distillation facilities, which can utilize the present invention is an advantageous fashion, is catalytic reforming, wherein the normally liquid portion of the reaction product effluent is stabilized, or re-run to provide a motor fuel having a particularly desired boiling range. Another application, to which the present invention may be put, is the separation of ethylbenzene from a mixture thereof with various xylene isomers, or the separation of one particular isomer from the mixture. In the separation of an aromatic concentrate from a mixture with non-aromatics, via solvent extraction, the reboiler liquid bottoms material in the extractive distillation column constitutes the solvent employed in admixture with the desired aromatics. In these processes, as well as many others well known in the art of petroleum and petrochemical operations, an external process stream — e.g. a reaction zone product effluent — circulates through a heat-recovery reboiler, vaporizes at least a portion of the liquid bottoms material therein, and whereby supplies at least a portion of the distillation column heat requirements. It is to this type of distillation technique that the present invention is specifically directed. The principal advantages concern improved stability with respect to the thermal balance of the column and an enhancement of separation efficiency in achieving the desired end product.

OBJECTS AND EMBODIMENTS

A principal object of my invention is to provide a control method and system for regulating the heat input to the reboiler section of a distillation column. A corollary objective affords a measurement of the actual quantity of vaporous material passing upwardly into the fractionation section of a distillation column from the reboiler section thereof.

In a dual-reboiler distillation facility, a specific object involves regulating the heat input to one of the external reboilers in response to the total vapor flow into the fractionation section. Ultimate objectives include improved stability in the overall thermal balance of the column, and an enhancement in the steady-state character of the separation efficiency.

These objects are achieved by providing a method for controlling heat input to the reboiler section of a distillation column having two external heat-recovery reboiler heaters appurtenant thereto, which method comprises the steps of: (a) withdrawing a liquid bottoms stream from said reboiler section; (b) regulating the quantity of a first portion of said bottoms stream removed from said distillation column as a bottoms product, in response to the level of liquid in said reboiler section; (c) introducing a second portion of said bottoms stream into a first of said external heaters, and therein heating and partially vaporizing said second portion via indirect contact therein with an external process stream; (d) passing the heated, mixed-phase second portion of said bottoms into a substantially liquid-free area of said reboiler section, and therein disengaging liquid from said heated mixed-phase; (e) introducing a third portion of said bottoms stream into the second of said external heaters, and therein heating and partially vaporizing said third portion; (f) passing the heated, mixed-phase third portion of said bottoms stream into said substantially liquid-free area of the reboiler section, and therein disengaging liquid therefrom; (g) measuring, within said reboiler section, the quantity of vapor passing upwardly from the reboiler section into the fractionation section of said distillation column; and, (h) regulating the heat input to said second external reboiler heater in response to a signal representative of the measured quantity of vapor passing into said fractionation section, thereby regulating the heat input to said reboiler section.

In another specific embodiment, my invention is directed towards a control system for regulating heat input to the reboiler section of a distillation column having a first heat-recovery, external reboiler heater appurtenant thereto, said heater having feed input means through which heat is supplied by a circulating process stream, which control system comprises, in cooperative combination: (a) a receiving chamber for liquid bottoms material in said reboiler section, means to circulate a first portion thereof through said first heater, whereby said first portion is heated and partially vaporized therein; (b) a second external reboiler heater having feed input means thereto and means to heat said second heater; (c) means to circulate a second portion of said bottoms material through said second heater, whereby said second portion is heated and partially vaporized therein; (d) heat-varying means for adjusting the heat input to said second reboiler section; (e) conduit means for introducing the partially vaporized first and second portions of said bottoms material from said reboiler heaters into said reboiler section; (f) flow-measuring means internally disposed within said reboiler section and responsive to the quantity of vapor flowing upwardly from said reboiler section into the fractionation section of said distillation column; (g) signal-receiving means in communication with said flow-measuring means for sensing and indicating a signal representative of the quantity of vapor passing into said fractionation section, said signal-receiving means being in communication with said heat-varying means to transmit said signal to said heat-varying means, whereby the heat input to said second heater is adjusted in response to the quantity of flowing vapors; and, (h) flow-regulating means for withdrawing excess liquid bottoms material from said reboiler section and out of said distillation column.

In another embodiment, the control system is further characterized in that a level-sensing means receives a signal representative of the level of liquid in said reboiler section and transmits said signal to said flow-regulating means, whereby the withdrawal of liquid out of said distillation column is adjusted in response to said liquid level. In a specific embodiment, the liquid-sensing means maintains the level of liquid bottoms in said reboiler section out of contact with said flow-measuring means.

These, as well as other objects and embodiments will become evident, by those possessing the requisite expertise in the art, from the following, more detailed description. In further describing my invention, reference will be made to the accompanying diagrammatic illustration which is presented to aid in the clear understanding thereof.

SUMMARY OF INVENTION

As hereinbefore set forth, many aspects of the distillation technique constitute contributing factors with respect to the thermal balance and separation efficiency. In addition to the heat input to the reboiler section by way of the return of heated, mixed-phase bottoms material, such factors include the rate and temperature of the reflux stream; the rate, temperature and composition of the feed stream; and, the various locations of the reflux and feed trays. The effect, however, of the reboiling operation appears to be the more pronounced. Heat input, by way of the mixed-phase stream return from the external reboiler heater, takes two forms: (1) the sensible heat of the liquid; and, (2) the latent heat absorbed by the vapors during vaporization. Of these two, the greater proportion of heat input is attributed to the latent heat of vaporization. Whether considering a comparatively wide boiling range bottoms material, a narrow boiling range liquid or a substantially pure compound, control of the reboiler section heat input is tantamount to a successful, efficient operation.

Economic considerations in the design of various petroleum and petrochemical processes dictate the utilization of heat-recovery circuits in order to minimize the overall process utility cost. Therefore, a great many of these processes, having distillation or fractionation facilities integrated therein, will employ a heat-recovery reboiler which utilizes, as the heating medium, a hotter, external process stream. This heat-recovery reboiler generally takes the form of the well known shell and tube heat exchanger. A portion of the liquid bottoms material is withdrawn from the reboiler section of the column, and is introduced into one side of the heat exchanger. The cooled, external process stream is returned to its intended destination within the process. Various other design considerations further dictate that the temperature of the external process stream, as it emanates from the heat-recovery reboiler heater be carefully controlled. Furthermore, due to a varying flow rate, or supply temperature of the circulating process stream, the quantity of heat supplied to the reboiler section through this heat-recovery boiler will not be constant. It might be added that this particular quantity of heat is also generally insufficient for the total required column duty.

This necessitates the utilization of a second external reboiler heater. Although the second reboiler heater may be of the direct-fired type, it is, in most instances economically preferable to utilize a second shell and tube heat exchanger, again utilizing a hotter external stream. Heretofore, the quantity of heat supplied by the second reboiler heater would have been maintained by controlling the amount of fuel, or heat exchange medium in response to the temperature of all the heated, mixed-phase bottoms material being returned to the reboiler section. However, as hereinafter indicated, this controlled technique does not solve the problem of fluctuating heat input to the reboiler section of the distillation column.

Correlations of heat content versus temperature, at varying percentages of vaporization will indicate a relatively large temperature differential (delta-T) per unit of heat content, when such correlations are directed toward liquid bottoms material having a comparatively wide boiling range. Therefore, a change in the temperature of the heated material being returned to the reboiler section can be employed to adjust the heat input, thus maintaining some semblance of thermal balance. Where, however, the liquid bottoms material is a substantially pure compound, or a component mixture having a narrow boiling range — i.e., 10° F., or less — the correlations show that very little, if any, delta-T is available for vaporization control. That is, the temperature remains virtually the same regardless of the percentage vaporization. In this situation, regulating the heat input by way of temperature measurement of the heated, mixed-phase material serves no useful purpose. It is recognized that, regardless of the character of the reboiler section bottoms liquid, the appropriate published literature is replete with a multitude of illustrations of control systems designed to maintain either thermal balance, or separation efficiency. No attempt will be made herein to delineate exhaustively the various schemes and techniques. It will suffice to present a few of the more prevalent examples.

PRIOR ART

As hereinabove set forth, temperature control anywhere in the reboiler heater circuit falls short of achieving the desired end result. Similarly, a measurement of the flow of mixed-phase material in the return conduit is meaningless since the sensing means does not readily distinguish between liquid and vapor, and highly inaccurate measurements result. Some methods have been proposed which rely upon a temperature measurement within the reboiler section; however, as above-stated, this does not provide an accurate picture of the degree of vaporization which has been effected in the reboiler heater, and how much vapor flows upwardly from the reboiler section to the fractionation section. These shortcomings are avoided through the utilization of the present invention, the essence of which is the measurement of the quantity of vapor actually passing upwardly from the reboiler section into the fractionation section of the distillation column. A signal, representative of the vapor flow is appropriately received and transmitted to heat-varying means in the heat exchange medium line, or the fuel line, to the reboiler heater. The internal configuration of the reboiler section is such that all the vapor passing into the fractionation section passes through the flow-measuring means which is disposed in a vapor chimney. Furthermore, the measurement of vapor flow is effected in a substantially liquid-free environment. The flow-measuring means is most conveniently either a venturi, or orifice plate, and is disposed within its own vapor riser. A horizontally-disposed, imperforate baffle is located below the lowermost tray and above the vapor riser containing the flow-measuring means. Thus, liquid flowing downwardly from the lowermost tray, into the reboiler section, is prohibited from entering the vapor riser containing the flow-measuring means. Similarly, the level of liquid within the reboiler section is maintained out of contact with the flow-measuring means. The control system of the present invention affords, therefore, the measurement of vapor flow in a substantially liquid-free environment, thereby enhancing the stability of thermal balance as well as separation efficiency.

Typical of the prior art technique directed toward a distillation column having two external reboiler heaters is that found in U.S. Pat. No. 3,309,288 (Cl. 203-1). Here, however, the heat input to one of the reboiler heaters is controlled in response to the level of liquid within the reboiler section, and there exists no recognition of the technique which measures internally the quantity of vapors flowing into the fractionation section from the reboiler section. Furthermore, the present method of control involves regulating the removal of excess reboiler liquid bottoms material, from the distillation facility, in response to the liquid level.

Exemplary of other prior art distillation techniques are those found in U.S. Pat. No. 3,411,308 (Cl. 62-21) and U.S. Pat. No. 3,225,550 (Cl. 62-21), which are very similar, and both of which involve fractional distillation wherein a portion of the liquid bottoms material is withdrawn and introduced into either an external reboiler heater, or heat-exchanger, with the heated material being re-introduced into the reboiler section. However, in both instances, the Patentees return a stream which is 100% vapor, in contrast to a mixed-phase stream. Were this not the situation, the constant presence of liquid, or slugs thereof stemming from a malfunction, would cause the flow-measuring devices utilized by the Patentees, external to the reboiler section, to give false and erratic readings, thus rendering their control systems inoperative. This is precisely the kinds of egregious situations which are avoided through the use of my invention wherein the vapor-measuring device is physically located within the reboiler section and vapor measurement is effected in a liquid-free environment. Neither of the Patentees recognize this technique, nor is the same to be found in other segments of the prior art. The present invention is a modification of the reboiler control system and reboiler section as found in my U.S. Pat. Nos. 3,881,994 (Cl. 202-160) and 3,888,743 (Cl. 202-158).

DESCRIPTION OF DRAWING

The accompanying diagrammatic illustration is presented for the sole purpose of affording a clear understanding of the control method and system encompassed by the present invention. It is not, therefore, considered to having a limiting effect upon the scope and spirit of the present invention as defined by the appended claims. The drawing will be described in conjunction with a commercially-scaled adsorption system designed to recover paraxylene from a mixture thereof with other aromatic hydrocarbons. The process is designed to recover a paraxylene-rich product having a purity greater than about 99.0% by volume from a feed stock being charged to the unit at a rate of about 53,700 Bbl./day. The composition of the aromatic feed stream to the process, in moles per hour, is presented in the following Table I:

TABLE I

| Charge Stock Composition | |
|---|---|
| Component | Mols/Hr. |
| Toluene | 85.93 |
| P plus N* | 356.99 |
| Ethylbenzene | 812.35 |
| p-Xylene | 1076.82 |
| m-Xylene | 2783.65 |
| o-Xylene | 1236.56 |

TABLE I-continued

| Charge Stock Composition | |
|---|---|
| Component | Mols/Hr. |
| Heavy Aromatics | 2.60 |

*Paraffins plus Naphthenes

Processes designed for the selective recovery of a particular hydrocarbon from a mixture thereof with its isomers and/or with other classes of hydrocarbons, and which make use of a solid-bed absorbent, are thoroughly described in the published literature. In view of the fact that the solid adsorption process is herein mentioned solely for illustration purposes, as one of the multitude of processes which are enhanced through the use of the present invention, it is not necessary to discuss the same in great detail. Descriptions of several such processes may be found in U.S. Pat. Nos. 2,985,589 (Cl. 210-34), 3,715,409 (Cl. 260-674 SA), 3,734,974 (Cl. 260-674 SA) and 3,558,732. Briefly, the adsorption process is carried out by initially contacting the hydrocarbon feed stream with a solid bed of ion-exchanged crystalline aluminosilicate adsorbent selected from Type X and/or Type Y zeolitic material. The desired component is adsorbed, and a raffinate is withdrawn from the adsorbent bed. Contact is then made with a suitable desorbent which removes the desired component as an extract stream. Since both the extract and the raffinate streams contain desorbent material, they are separately processed in individual columns to recover the streams substantially free from desorbent.

The overhead stream from the extract column constitutes the charge stock to fractionation column 1 in the accompanying drawing. A portion of the recovered desorbent in an amount of about 10,325.7 mols/hr., at a temperature of about 369° F., is used as the heat exchange medium for heat exchanger 32, the first external heat recovery reboiler. The temperature of the return stream in line 37, must be controlled at a level of about 350° F. A portion of the liquid bottoms material from an associated process column, in an amount of about 1,829.2 mols/hr., at a temperature of about 417° F. is employed as the heat exchange medium to heat exchanger 22, the second external "column control" reboiler heater. The charge stock to fractionation column 1, referred to in the adsorption art as a "finishing" column, introduced by way of inlet port 9 and line 10, has the composition shown in the following Table II:

TABLE II

| Feed to Finishing Column | |
|---|---|
| Component | Mols/Hr. |
| Toluene | 21.58 |
| P plus N | — |
| Ethylbenzene | 2.07 |
| p-Xylene | 990.67 |
| m-Xylene | 2.06 |
| o-Xylene | 0.70 |

Referring now to the drawing, finishing column 1 is shown as having a fractionation section 2 and a reboiler section 3. With respect to the latter, it will be recognized, by those skilled in the art, that reboiler section 3 is a "thermosiphon" reboiler, as distinguished from a "once-through" reboiler. An overhead vaporous stream is withdrawn by way of outlet port 4 and line 5. This vaporous fraction, containing substantially all the toluene in the feed and only a trace of p-xylene, is at a temperature of about 251° F.; this material is condensed to a temperature of about 150° F., and about 1,261.1 mols/hr. are returned to column 1 as reflux via inlet port 6 and line 7. Column 1 will contain from about 20 to about 200 perforated trays, or decks; in the present illustration, the finishing column contains 60 trays which are alternately disposed from uppermost tray 8 to lowermost tray 11. It is understood that the precise number of decks 8 and 11 is not essential to the present inventive concept. A liquid bottoms portion is withdrawn via outlet port 25 and line 26, at a rate of about 6,479.3 mols/hr. and a temperature of about 326° F. Of this amount, 3,319.2 mols/hr. is diverted via line 31 into heat exchanger 32, wherein the heat content, in terms of $10^6$ BTU/hr. is increased from 42.18 to 58.39, as a result of the return, through line 33 and inlet port 34, of 1,106.4 mols/hr. of vapor (about 33.3% vaporization). The hot desorbent in line 35, passes through three-way valve 36 in an amount of 7,123.0 mols/hr. The remaining 3,202.7 mols/hr. are by-passed through line 40 into line 37. Temperature Recorder Controller (TRC) 38 senses the temperature of the desorbent in line 37 and transmits the appropriate signal to valve 36 via instrument line 39. As either the supply temperature, or the rate of desorbent in line 35 varies, TRC 38 adjusts valve 36 to the extent necessary to regulate the flow through by-pass 40 in order to maintain the temperature of desorbent in line 37 at 350° F. Thus, the heat content of the mixed-phase bottoms material in line 33 fluctuates.

Another portion of the bottoms material in line 26, 2,164.6 mols/hr., is diverted via line 28 into column control reboiler 22. The remaining quantity, 995.5 mols/hr. continues through line 26, containing control valve 27, and is withdrawn as the product stream of the process. A component analysis of the product stream is presented in the following Table III:

TABLE III

| Paraxylene Product Analysis | |
|---|---|
| Component | Mols/Hr. |
| Toluene | — |
| P plus N | — |
| Ethylbenzene | 2.07 |
| p-Xylene | 990.67 |
| m-Xylene | 2.06 |
| o-Xylene | 0.70 |
| Heavy Aromatics | — |

The heat content of the 2,164.6 mols/hr. of liquid bottoms material in line 28 is about $27.51 \times 10^6$ BTU/hr. Heating medium from a external source, at a temperature of 417° F. and a rate of 1,829.2 mols/hr., is introduced via line 21 into heat exchanger 22. This is sufficient to raise the heat content of the bottoms material returning via line 29 and inlet port 30, to about $38.09 \times 10^6$ BTU/hr. (resulting from about 52.1% vaporization in heat exchanger 22). The cooled heating medium is returned, via line 23, containing control valve 24, to its source.

The internal flow-measuring means is shown, in this illustration, as an orifice plate 14, internally disposed in vapor riser 15. Vertical baffle 16 and horizontal plate 17 divide the reboiler section so that vapor-liquid mixture return from the reboilers does not contact the liquid descending from lowermost tray 11. An imperforate tray 12 is located between lowermost tray 11 and vapor riser 15. Thus, all the liquid material flowing downwardly from tray 11 must seek a pathway to the reboiler section other than the vapor riser itself. Therefore, the vapor riser and orifice plate 14 are disposed in a substantially liquid-free environment. The level of liquid bottoms material is maintained out of contact with orifice plate 14 by Level Indicating Controller (LIC) 41 which functions through the use of column taps 42 and 43. The appropriate signal is transmitted from LIC 41, via instrument line 44, to control valve 27 which opens or closes further to regulate the rate of bottoms removal from the column through line 26.

Orifice plate 14 is normally designed to create a pressure drop of about 20 in. $H_2O$, when the desired rate of vapor flows through riser 15 into the fractionation section of column 1. This pressure difference, representative of the rate of flow of this vapor is received, via conduit 18, by FRC 19. FRC 19 creates a signal that is transmitted to control valve 24 via instrument line 20, and the heat input to reboiler heater 22 is adjusted in response to the rate of vapor flow.

ILLUSTRATIVE EXAMPLE

In presenting this example of the functioning of the present dual-reboiler vaporization control system, it will be presumed that column 1 has attained steady-state operation and thermal balance while operating in accordance with the values of the variables hereinabove set forth in the description of the drawing. For whatever reason, it will be presumed that the supply temperature of the desorbent in line 35 decreases, and to the extent that the temperature of the returned desorbent in line 37 drops below 350° F. TRC 38 will transmit the required signal to three-way valve 36 which will, in turn, effect an increase in the flow through by-pass 40. The net result is a decrease in the percentage vaporization effected in heat exchanger 32. The lowering of the total vapor flow rate in riser 15 will result in a lower pressure drop across orifice plate 14. FRC 19 will, in turn, transmit a different signal via instrument line 20 to control valve 24. The latter will open further, and the heat input to column control reboiler 22 thus increased by way of increased flow of heating medium, in line 21. A greater percentage of vaporization of the bottoms material in line 28 is effected, there is increased vapor flow in vapor riser 15, and the column once again attains thermal balance and a stable separation efficiency.

I claim as my invention:

1. A method for controlling heat input to the reboiler section of a distillation column comprising a reboiler section and a fractionation section, said column having two external heat-recovery reboiler heaters appurtenant thereto, which method comprises the steps of:
  a. withdrawing a liquid bottoms stream from said reboiler section;
  b. regulating the quantity of a first portion of said bottoms stream removed from said distillation column as a bottoms product, in response to the level of liquid in said reboiler section;
  c. introducing a second portion of said bottoms stream into a first of said external heaters, and therein heating and partially vaporizing said second portion via indirect contact therein with an external process stream;
  d. passing the heated, mixed-phase second portion of said bottoms stream into a substantially liquid-free area of said reboiler section, and therein disengaging liquid from said heated mixed-phase;
  e. introducing a third portion of said bottoms stream into the second of said external heaters, and therein heating and partially vaporizing said third portion;
  f. passing the heated, mixed-phase third portion of said bottoms stream into said substantially liquid-free area of the reboiler section, and therein disengaging liquid therefrom;
  g. measuring, within said reboiler section, the quantity of vapor passing upwardly from the reboiler section into said fractionation section of said distillation column; and
  h. regulating the heat input to said second external reboiler heater in response to a signal representative of the measured quantity of vapor passing into said fractionation section, thereby regulating the heat input to said reboiler section.

2. The method of claim 1 further characterized in that the quantity of vapor passing into said fractionation section is measured in a substantially liquid-free environment.

3. The method of claim 1 further characterized in that the heat input to said second external heater is reduced in response to increased vapor flow and vice versa.

* * * * *